United States Patent [19]

Kim

[11] Patent Number: 5,790,350
[45] Date of Patent: Aug. 4, 1998

[54] HEAD DRUM ASSEMBLY FOR A VCR WITH A SHAFT INCLUDING A VERTICAL GROOVE AND A SLANTED GROOVE

[75] Inventor: Keum-Mo Kim, Seoul, Rep. of Korea

[73] Assignee: Daewoo Electronics Co., Ltd., Rep. of Korea

[21] Appl. No.: 775,083

[22] Filed: Dec. 30, 1996

[30] Foreign Application Priority Data

Dec. 29, 1995 [KR] Rep. of Korea ............... 1995-62750

[51] Int. Cl.⁶ .................................................. G11B 5/52
[52] U.S. Cl. ................................... 360/107; 360/84
[58] Field of Search ................................ 360/84, 107

[56] References Cited

U.S. PATENT DOCUMENTS

| | | | |
|---|---|---|---|
| 4,363,047 | 12/1982 | Maruyama et al. | 360/107 |
| 4,678,348 | 7/1987 | Tielemans et al. | 384/114 |
| 4,972,283 | 11/1990 | Kim | 360/107 |
| 5,277,499 | 1/1994 | Kameyama | 384/123 |
| 5,581,425 | 12/1996 | Choi | 360/84 |
| 5,675,457 | 10/1997 | Kim | 360/107 |

FOREIGN PATENT DOCUMENTS

| | | | |
|---|---|---|---|
| 0 527 450 A1 | 2/1993 | European Pat. Off. | |
| 3829-563 | 3/1989 | Germany | 360/107 |
| 61-104416 | 5/1986 | Japan | 360/84 |
| 1-276416 | 11/1989 | Japan | 360/107 |
| 4-26910 | 1/1992 | Japan | 360/84 |

*Primary Examiner*—Jefferson Evans

[57] ABSTRACT

Disclosed is a head drum assembly for a VCR having a simple structure and high reliability. Provided is a shaft including a vertical groove extending from an upper portion to a lower portion of the shaft, a slanted groove extending from a lower end portion of the vertical groove to a maximum height that the shaft reaches, and a thrust cap inserted onto an upper end portion of the shaft by pressure. A lower drum is inserted into a lower end portion of the shaft by pressure and has a stator transfromer installed at the inner upper portion of the lower drum. An upper drum has at least two video heads installed at an outer bottom portion of the upper drum, and has a rotor transformer corresponding to the stator transformer at an inner bottom portion of the upper drum. A motor for imparting a driving force to the upper drum and for rotating the upper drum is provided. Bearing supporting effect can be obtained by using oil having low viscosity. Therefore, a consuming electric power can be reduced and a stable recording/reproduction can be achieved.

11 Claims, 5 Drawing Sheets

1

HEAD DRUM ASSEMBLY FOR A VCR WITH A SHAFT INCLUDING A VERTICAL GROOVE AND A SLANTED GROOVE

BACKGROUND OF THE INVENTION

1. Field of the Invention

The present invention relates to a head drum assembly for a VCR, and more particularly to a head drum assembly for a VCR which employs a fluid dynamic pressure bearing and has a good lubricating effect and therefore, consumes less electric power and produces less noise.

2. Description of the Prior Art

Generally, a VCR is an apparatus for recording an image and/or an audio signal onto a magnetic tape running along a running system or for reproducing recorded signals. The magnetic tape is wound on a pair of wheels provided in a cassette, and when the cassette is loaded into a deck of a tape recorder according to a loading mechanism, the pair of wheels are respectively mounted on a take-up reel tape and a supply reel table installed on the deck. After completion of the installation, tape drawing members draw the tape from the cassette positioned at a loading place so that the tape makes contact with about a half of the circumference of the head drum. After that, a selected running operation such as playing, recording, fast forwarding, rewinding, etc. is carried out. At this time, the magnetic tape is drawn out from a wheel and wound around the other wheel according to the rotational direction of the take-up reel table and the supply reel table.

Among the members constituting the magnetic recording/reproducing apparatus, since the rotary head drum directly participates in recording and reproducing signals, the rotary head drum needs to be highly reliable and stable. In addition, the vibration and the noise of the head drum should be restrained after a long use.

When the vibration of the head drum assembly is generated, the stable recording/reproducing of an information onto/from a tape is difficult and resulted in a jittering or a wow-fluttering. The jittering and the wow-fluttering creates a noise with respect to an image. In order to solve this problem, a lubricating device is provided with the head drum assembly. As the lubricating device, a bearing a widely used and the bearing is mainly divided into a ball bearing and a fluid dynamic pressure bearing.

FIG. 1 illustrates the conventional head drum assembly for a VCR, which employs a ball bearing. A head drum assembly 10 mainly includes a lower drum 12 installed on a deck, an upper drum 11 positioned above lower drum 12 and having video heads 15 which records/reproduces an information onto/from a magnetic tape, a motor 13 installed under lower drum 12 and generating a driving force for rotating upper drum 11, a shaft 14 for transporting the rotational force of motor 13 to upper drum 11, and an upper bearing 17a and a lower bearing 17b together forming a ball bearing lubricating device for supporting and lubricating shaft 14.

Motor 13 includes a stator 13a which is transformed into a magnet when a current is applied, and a rotor 13b which is positioned at a predetermined distance apart from stator 13a in the radial direction of stator 13a and rotates by the reaction of rotor 13b with stator 13a. Shaft 14 is connected to rotor 13b by a lower flange 19b and rotates together with rotor 13b. On shaft 14, an upper flange 19a is extrapolated.

Since upper drum 11 is fixed to upper flange 19a by means of a screw, upper drum 11 rotates by shaft 14. Video heads 15 are electrically connected with a rotor transformer 11a, which is installed on the bottom portion of upper drum 11. Rotor transformer 11a is related in a non-contacting manner with a stator transformer 12a, which is installed on lower drum 12.

At the inner upper portion of lower drum 12, an upper receiving groove 16a for inserting upper bearing 17a is formed, and at the inner lower portion of lower drum 12, a lower receiving groove 16b for inserting lower bearing 17b is formed. Upper and lower bearings 17a and 17b includes outer wheels which are inserted into upper and lower receiving grooves 16a and 16b, inner wheels which are inserted into shaft 14, and a plurality of balls for supporting and lubricating shaft 14.

However, in head drum assembly 10 employing the above described ball bearing, noise and vibration due to the sliding friction of the balls are generated. During the recording/reproduction of the information onto/from the tape, the vibration induces the jittering and the wow-fluttering to deteriorate the image quality.

Recently, is consideration of the problems of the head drum assembly employing the ball bearing, a fluid dynamic pressure bearing assembly has been utilized. Lubricating apparatuses employing the fluid dynamic pressure bearing are disclosed in U.S. Pat. No. 4,972,283 issued to Kim on Nov. 20, 1990, with the title of "Rotary Head Drum for VCR," and U.S. Pat. No. 5,277,499 issued to Kameyama on Jan. 11, 1994, with the title of "Dynamic Pressure Bearing Apparatus". By the fluid dynamic pressure bearing supporting method, more precise rotation can be achieved than by the ball bearing supporting method.

FIG. 2 illustrates a head drum assembly 20 employing the fluid dynamic pressure. In the drawing, head drum assembly 20 includes an upper drum 21 having video heads 25 at the bottom portion of upper drum 21, a lower drum 22 installed under upper drum 21 and having the same outer diameter as upper drum 21, a shaft 24 inserted into lower drum 22 by pressure, and a motor for rotating upper drum 21.

At the outer periphery of shaft 24, herringbone-shaped grooves 29 are formed, and at the upper end portion of shaft 24, a thrust bearing 26 for supporting a thrust loading is installed. At the outer portion of shaft 24, a bearing housing 28 is installed, and between bearing housing 28 and shaft 24, a fluid dynamic pressure bearing 27 is provided.

As a signal transporting apparatus for transporting the signal recorded/reproduced onto/from video heads 25, a stator transformer 23a and a rotor transformer 23b are installed, such that shaft 24 is at their centers and such that they are parallel to shaft 24.

Motor 30 includes a rotor 30b installed at the bottom portion of upper drum 21 and a stator 30a installed at the upper portion of lower drum 22. When a current is applied to stator 30a, rotor 30b starts to rotate. When rotor 30b rotates, upper drum 21 having video heads 25 stars to rotate around shaft 24.

In the conventional head drum assembly as described above, an oil is injected between grooves 29 and bearing 27 for achieving a lubricating effect and a load supporting power. In this case, the oil should have a high viscosity. If an oil having a low viscosity is used, the oil having the low viscosity might leak out along the shaft and contaminate a traveling system and the tape.

However, if an oil having the high viscosity is used, a driving torque is increased during the rotation of the upper drum and a consuming electric power also is increased. In addition, since the herringbone-shaped grooves are very complicated, the manufacturing thereof is very difficult.

SUMMARY OF THE INVENTION

To solve the problems of the conventional art, it is an object of the present invention to provide a head drum assembly for a VCR which has a simple structure, can be advantageously manufactured, and has a good lubricating effect so that a driving torque is reduced and the generation of noise is prevented.

To accomplish the object of the present invention, there is provided a head drum assembly for a VCR comprising a shaft including a vertical groove extending from an upper portion to a lower portion of the shaft, a slanted groove formed from a lower end portion of the vertical groove to a height where the shaft reaches, and a thrust cap inserted onto an upper end portion of the shaft by pressure, a lower drum inserted into a lower end portion of the shaft by pressure and having a stator transformer installed at an inner upper portion of the lower drum, an upper drum having at least two video heads installed at an outer bottom portion of the upper drum, and having a rotor transformer corresponding to the stator transformer at an inner bottom portion of the upper drum, and a motor for imparting a driving force to the upper drum and for rotating the upper drum.

Particularly, a lower oil storing groove is formed at an upper center portion of the lower drum and around the shaft, which is where the oil storing groove is connected with a lower end portion of the vertical groove and the slanted groove.

And an upper oil storing groove is formed at a bottom portion of the thrust cap. More preferably, this upper oil storing groove includes a plurality of spiral grooves.

An upper oil storing groove can also be formed at an upper center portion of the upper drum. This lower oil storing groove can be formed by a plurality of spiral grooves.

As another way, an upper oil storing groove can be formed both at a bottom portion of the thrust cap and at an upper center portion of the upper drum. In this case, the upper oil storing groove includes a plurality of spiral grooves formed at the bottom portion of the thrust cap and formed at the upper center portion of the upper drum. The spiral grooves formed at the bottom portion of the thrust cap and the spiral grooves formed at the upper center portion of the upper drum have directions which are opposite to each other.

A thrust bearing is installed at an inner bottom portion of the upper drum, and faces an upper center portion of the lower drum.

Preferably, the slanted groove is formed within 180° range of an outer periphery of the shaft. More preferably, the slanted groove is formed on the shaft at a portion thereof opposite to a portion thereof where the upper drum and the lower drum receive a load after they are installed on a deck.

The head drum assembly according to the present invention includes simplified shapes of a vertical groove and a slanted groove, a lower oil storing groove formed on the upper center portion of a lower drum and corresponding to the lower end portion of the vertical groove and the slanted groove, and an upper oil storing groove corresponding to the upper end portion of the grooves. Oil having a low viscosity can be employed and accordingly, a smooth lubricating effect and a stable recording/reproducing effect can be obtained.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, the constituting elements and the operation principles of the head drum assembly according to the preferred embodiment of the present invention will be explained in more detail with reference to the accompanying drawings.

Figure 1:
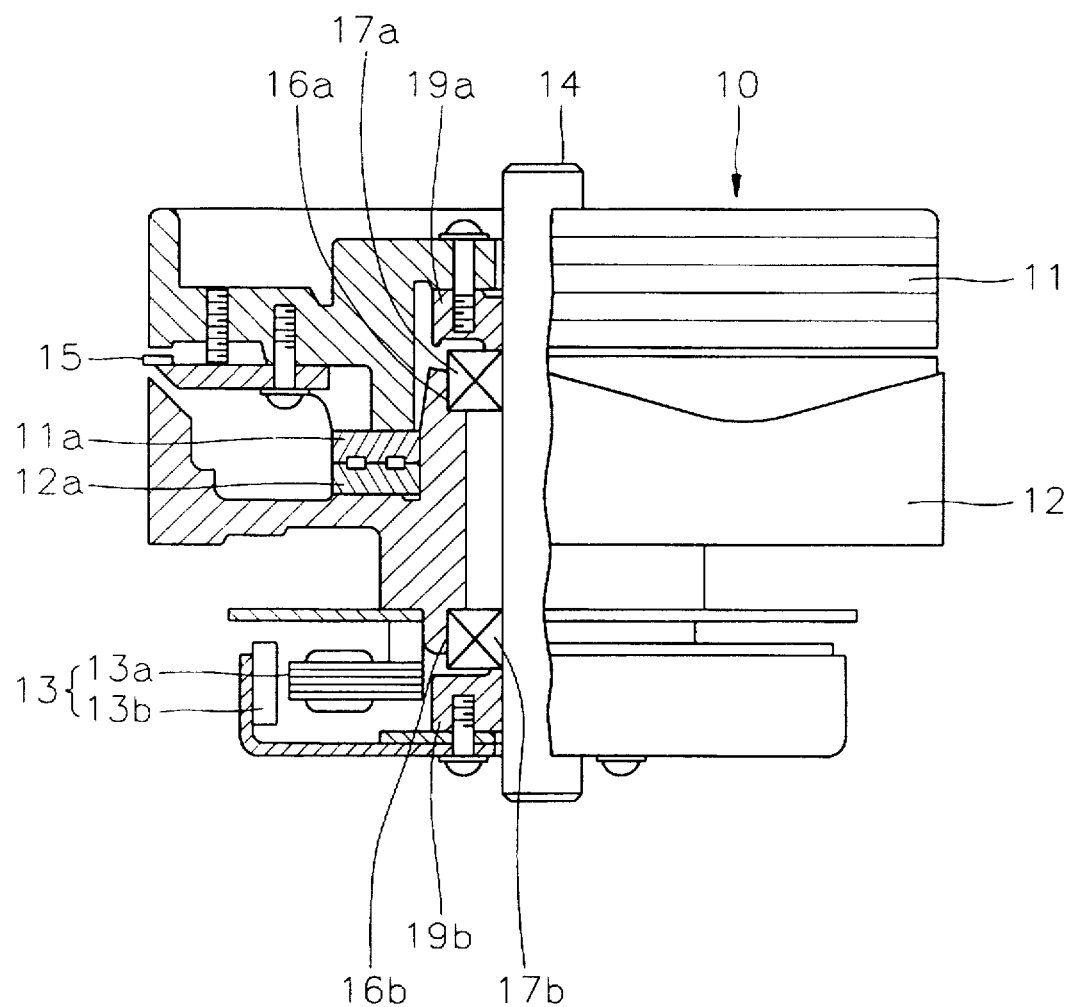
FIG. 1 is a partial section view and a partial front view of a conventional head drum for a VCR employing a ball bearing.
Figure 2:
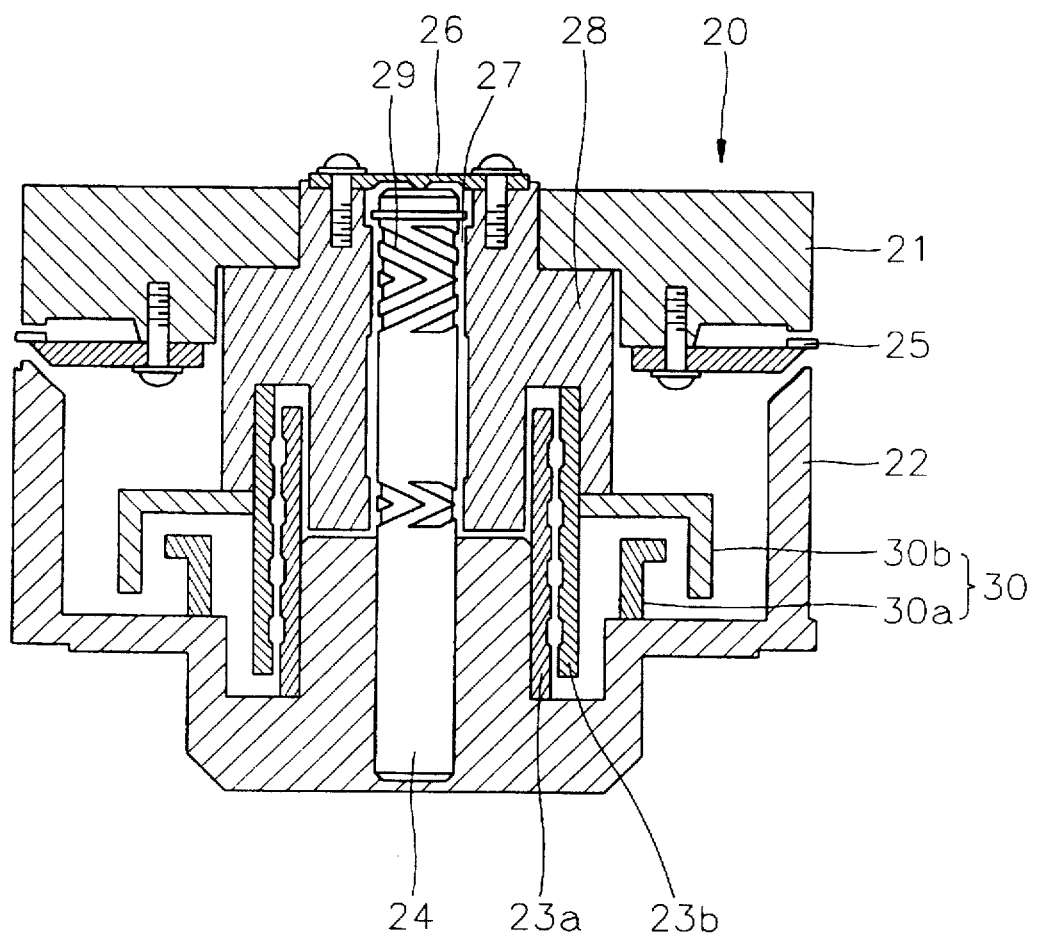
FIG. 2 is a cross-sectional view of a conventional head drum assembly for a VCR employing a fluid dynamic pressure bearing.
Figure 3:
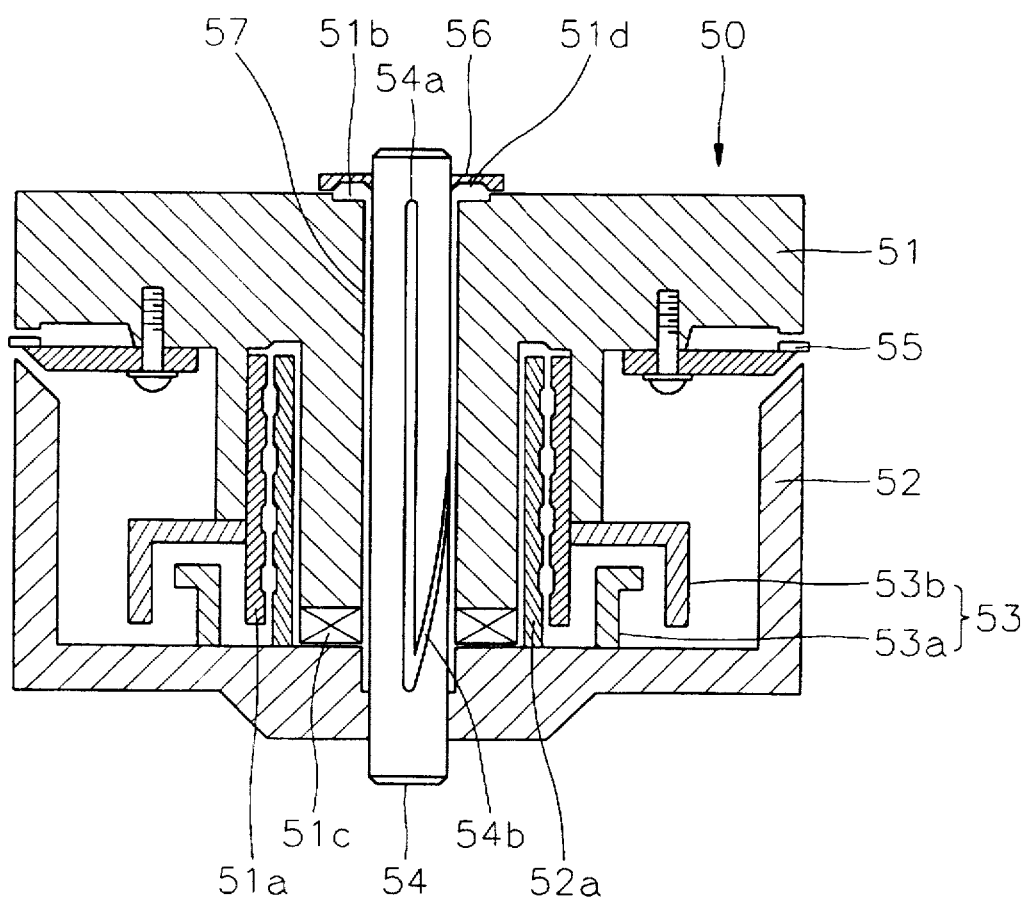
FIG. 3 is a cross-sectional view of a head drum assembly according to an embodiment of the present invention.

FIG. 3 is a cross-sectional view of a head drum assembly according to an embodiment of the present invention. The constituting elements will be described in brief, below.

A head drum assembly 50 includes an upper drum 51 having two video heads 55 which are installed at 180° apart from each other at the outer bottom portion of upper drum 51 by means of screws and having a rotor transformer 51a formed at the inner bottom portion of upper drum 51, a lower drum 52 installed under upper drum 51, having the same outer diameter as upper drum 51, and having a stator transformer 52a corresponding to rotor transformer 51a on the inner upper portion of lower drum 52, a shaft 54 inserted by pressure into lower drum 52, and a motor 53 installed within lower drum 52.

Motor 53 includes a rotor 53b formed at the bottom portion of upper drum 51 and a stator 53a corresponding to rotor 53b and formed at the upper portion of lower drum 52.

Figure 4:
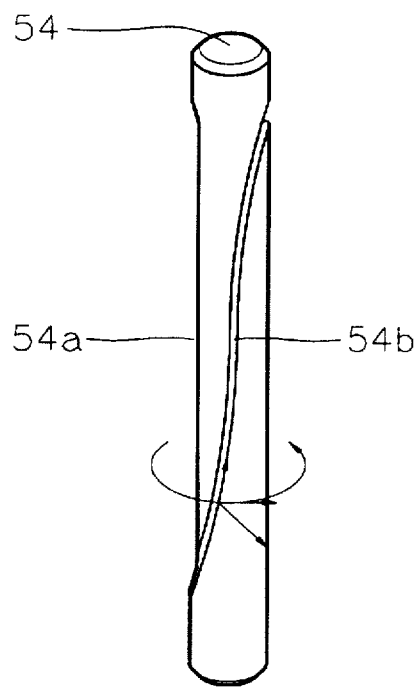
FIG. 4 is an enlarged perspective view of a shaft portion in the head drum assembly of FIG. 3.

At the outer periphery of shaft 54, a vertical groove 54a and a slanted groove 54b extending from the lower end portion of vertical groove 54a to the maximum height of vertical groove 54a, are formed. At the upper end portion of shaft 54, a thrust cap 56 is installed at a predetermined distance apart from upper drum 51. Thrust cap 56 prevents the separation of upper drum 51 from shaft 54 during the rotation of upper drum 51. FIG. 4 is an enlarged perspective view of shaft 54 of head drum assembly 50 illustrated in FIG. 3. Slanted groove 54b extends from the lower end portion of vertical groove 54a to the maximum height of vertical groove 54a, along the outer periphery of shaft 54.

At the upper center portion of lower drum 52 and around shaft 54, a lower oil storing groove 52b is formed. The size of lower oil storing groove 52b is determined according to the amount of the stored oil, and lower oil storing groove 52b is connected with the lower end portion of vertical groove 54a and slanted groove 54b.

An upper oil storing groove 51d is formed between thrust cap 56 and upper drum 51. Upper oil storing groove 51d consists of a groove formed at the bottom portion of thrust cap 56 and an upper groove 51b formed at the upper center portion of upper drum 51. Upper oil storing groove 51d is connected with the upper end portion of vertical groove 54a and slanted groove 54b. Upper oil storing groove 51d can be formed at both the bottom portion of thrust cap 56 and the upper center portion of upper drum 51, or can be formed at one portion among them. The gap between thrust cap 56 and upper drum 51 can be formed narrowly as about 10 μm wide so that the oil is not leaked out by a centrifugal force during the rotation of upper drum 51. However, if the gap is too narrow for preventing leakage of the oil, noise might be generated by the friction between upper drum 51 and thrust cap 56 during the rotation of upper drum 51. Accordingly, the gap should be adjusted in consideration of these two points.

Figure 5:
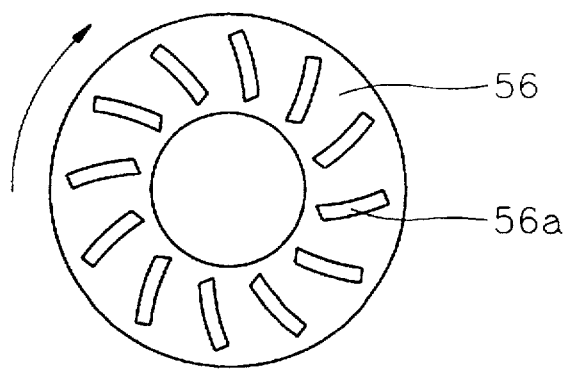
FIG. 5 illustrated spiral grooves formed at the bottom portion of a thrust cap in the head drum assembly of FIG. 3.

Upper oil storing groove 51d is preferably formed as a plurality of spiral grooves in order to minimize leakage of the oil due to the centrifugal force during the rotation of upper drum 51. FIG. 5 illustrates spiral grooves 56a formed at the bottom portion of thrust cap 56. By forming the sprial grooves as shown in FIG. 5, leakage of the oil can be prevented as follows. When shaft 54 is fixed and upper drum 51 positioned under thrust cap 56 rotates in the direction designated by an arrow, the oil receives a force outwardly from the centrifugal force. However, the oil returns to the center portion along the spiral grooves.

Upper groove 51b formed on upper drum 51 also can be preferably formed as spiral grooves. When both the groove formed at the bottom portion of thrust cap 56 and the groove formed at the upper portion of upper drum 51 are formed as a plurality of spiral grooves, the spiral grooves formed at the bottom portion of thrust cap 56 and the spiral grooves formed at the upper center portion of upper drum 51 should have directions which are opposite to each other.

At the bottom portion of upper drum 51 where lower drum 52 makes contact, a thrust bearing 51c is installed for giving a pre-load to the bearing. Thrust bearing 51c is formed as herringbone-shape grooves at the bottom portion of upper drum 51c. When upper drum 51 rotates, upper drum 51 rises to about 1–2 μm. Into the gap between upper drum 51 and lower drum 52, the oil is injected. The oil makes a pumping action during the rotation of upper drum 51 and pressurizes upward.

Slanted groove 54b formed on shaft 54 is preferably formed along the periphery of shaft 54 within 180°. More preferably, slanted groove 54b is formed at the portion thereof opposite to the portion thereof where the load of upper drum 51 and lower drum 52 act, after installing head drum assembly 50 on a deck. If slanted groove 54b is formed at the portion where the load of upper drum 51 and lower drum 52 act, the load supporting capability is reduced due to the space formed by the groove. Therefore, it is difficult to obtain a sufficient load supporting ability.

Figure 6:
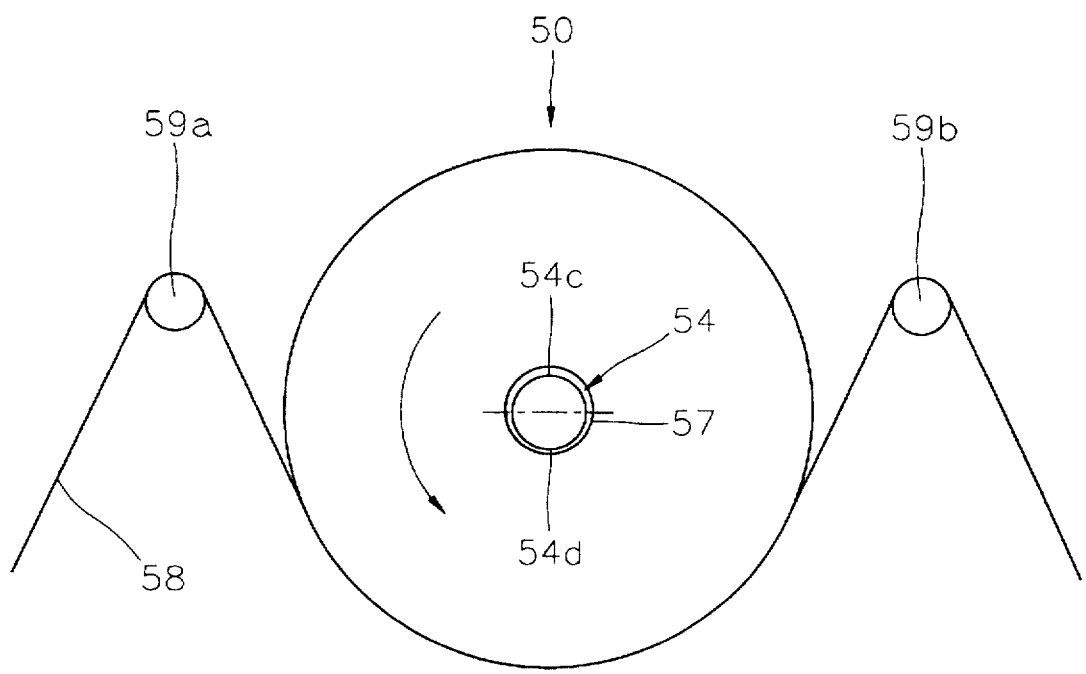
FIG. 6 illustrates the portion where the head drum assembly of the present invention receives a load, after the head drum is installed on a deck.

The portion where the load is applied on the head drum assembly will be described with reference to FIG. 6. A magnetic tape 58 is guided by a first and a second guide roller 59a and 59b and makes contact with about ⅔ of the outer peripheries of rotating upper drum 51 and fixed lower drum 52 of head drum assembly 50, while traveling. FIG. 6 is a brief drawing from the perspective of the upper portion of head drum assembly 50. Head drum assembly is installed on the deck with the lower portion thereof being inclined downward. When inclined upper drum 51 of head drum assembly 50 rotates with respect to shaft 54, the load of shaft 54 is applied downward as exaggaratively illustrated in FIG. 6. That is, the portion designated as 54d among the outer periphery of shaft 54 is the load receiving portion, while the portion designated as 54c is the portion opposite to the load receiving portion. Considering the effect owing to the load of shaft 54, inclined groove 54b is preferably formed on the portion 54c thereof opposite to the load receiving portion thereof.

When vertical groove 54a and slanted groove 54b are formed along shaft 54 as in the present invention, a stiffness of the shaft is deteriorated in comparison to the conventional shaft having the herringbone groove. This can be compensated by adjusting the gap between shaft 54 and a bearing surface 57 of head drum assembly 50. The stiffness is inversely proportional to a square of the gap between shaft 54 and bearing surface 57. That is, the stiffness can be increased by narrowing the gap. Therefore, sufficient stiffness can be obtained by appropriately designing the gap.

The operation of the head drum assembly having the above described constitution will be described below.

First, a sufficient amount of oil is filled in lower oil storing groove 52b formed at the upper center portion of lower drum 52, before a first driving. A current is applied to stator 53a to transform stator 53a into a magnet. Then, rotor 53b starts to rotate by the electromagnetic force generated by the reaction between stator 53a and rotor 53b. If rotor 53b rotates, upper drum 51 connected with rotor 53b starts to rotate, while lower drum 52 and shaft 54 inserted by pressure into lower drum 52 are fixed.

When upper drum 51 rotates, video heads 55 formed at the outer bottom portion of upper drum 51 making contact with the head drum reads image signals from traveling magnetic tape 58. Rotor transformer 51a formed at the inner bottom portion of upper drum 51 in parallel with shaft 54 and related with stator transformer 52a in a non-contacting manner, rotates together with upper drum 51 to transport the image signals from video heads 55 to stator transformer 52a.

When upper drum 51 rotates, the oil stored in low oil storing groove 52b rises along slanted groove 54b. The principle of the rising of the oil will be described with reference to FIG. 4. As shown in the drawing, when upper drum 51 rotates with respect to shaft 54 in the direction designated by an arrow, a force is applied to the oil in a tangenial direction. The oil rises along the groove by the component force having the same direction as slanted groove 54b among the component forces of this tangential force. The ascended oil reaches the upper end portion of vertical groove 54a through upper oil storing groove 51d, and then falls plumb down. That is, the oil circulates along vertical groove 54a and slanted groove 54b. A thin oil layer is formed around shaft 54 by the circulating oil, and this layer facilitates the rotation of upper drum 51 with respect to shaft 54.

Since the head drum assembly having the above described constitution has simple shapes of groove for the circulation of the oil, the manufacture of the assembly is very simplified. In addition, since the oil circulates along the vertical groove and the slanted groove in this system, the oil can be supplied to the bearing surface uniformly. This gives an effect of a smooth supporting of the bearing.

By defining the slanted groove formed at the outer periphery of the shaft within 180°, and by forming the slanted groove at the portion thereof opposite to the portion thereof where the upper drum and the lower drum receive the load, sufficient load supporting ability can be obtained.

Above all, since a separate oil storing groove is formed at the upper center portion of the lower drum, the leakage of the oil along the shaft can be prevented. Accordingly, an oil having low viscosity can be utilized. By applying the oil having low viscosity, the frictional force of the upper drum against the shaft during the rotation can be reduced.

Therefore, the value of the driving torque can be reduced and so, the consuming electric force can be reduced. Further, since a smooth rotation of the upper drum can be obtained, the noise due to the rotation can be reduced and a stabilized recording/reproduction by the video head can be achieved. Lastly, the reliability of the VCR employing the head drum assembly can be improved.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. A head drum assembly for a VCR, said head drum assembly comprising:

a shaft including a vertical groove extending from an upper portion to a lower portion of said shaft, a slanted groove extending contiguously from a lower end portion of said vertical groove to a maximum height that said shaft reaches, and a thrust cap inserted onto an upper end portion of said shaft by pressure;

a lower drum inserted into a lower end portion of said shaft by pressure and having a stator transformer installed at an inner upper portion of said lower drum;

an upper drum having at least two video heads installed at an outer bottom portion of said upper drum, and having a rotor transformer corresponding to said stator transformer at an inner bottom portion of said upper drum; and a motor for imparting a driving force to said upper drum and for rotating said upper drum.

2. A head drum assembly for a VCR as claimed in claim 1, wherein a lower oil storing groove is formed at an upper center portion of said lower drum and around said shaft, said oil storing groove being connected with a lower end portion of said vertical groove and said slanted groove.

3. A head drum assembly for a VCR as claimed in claim 2, wherein an upper oil storing groove is formed at a bottom portion of said thrust cap.

4. A head drum assembly for a VCR as claimed in claim 3, wherein said upper oil storing groove includes a plurality of spiral grooves.

5. A head drum assembly for a VCR as claimed in claim 2, wherein an upper oil storing groove is formed at an upper center portion of said upper drum.

6. A head drum assembly for a VCR as claimed in claim 5, wherein said lower oil storing groove includes a plurality of spiral grooves.

7. A head drum assembly for a VCR as claimed in claim 2, wherein an upper oil storing groove is formed at a bottom portion of said thrust cap and at an upper center portion of said upper drum.

8. A head drum assembly for a VCR as claimed in claim 7, wherein said upper oil storing groove includes a plurality of spiral grooves formed at the bottom portion of said thrust cap and at the upper center portion of said upper drum, said spiral grooves formed at the bottom portion of said thrust cap and said spiral grooves formed at the upper center portion of said upper drum having directions opposite to each other.

9. A head drum assembly for a VCR as claimed in claim 1, wherein a thrust bearing is installed at an inner bottom portion of said upper drum, and faces an upper center portion of said lower drum.

10. A head drum assembly for a VCR as claimed in claim 1, wherein said slanted groove is formed within 180° range of an outer periphery of said shaft.

11. A head drum assembly for a VCR as claimed in claim 10, wherein said slanted groove is formed on said shaft on a portion thereof opposite to a portion thereof where said upper drum and said lower drum receive a load, after said head drum is installed on a deck.

* * * * *